United States Patent
Woerner et al.

(10) Patent No.: US 12,136,021 B2
(45) Date of Patent: *Nov. 5, 2024

(54) QUANTUM STATE PREPARATION OF A PROBABILITY DISTRIBUTION FACILITATING QUANTUM AMPLITUDE ESTIMATION

(71) Applicant: International Business Machines Corporation, Armonk, NY (US)

(72) Inventors: Stefan Woerner, Zürich (CH); Almudena Carrera Vazquez, Thalwil (CH)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,183

(22) Filed: May 17, 2023

(65) Prior Publication Data
US 2023/0289647 A1   Sep. 14, 2023

Related U.S. Application Data

(63) Continuation of application No. 16/671,796, filed on Nov. 1, 2019, now Pat. No. 11,734,598.

(51) Int. Cl.
    G06N 10/00    (2022.01)
    G06N 10/60    (2022.01)
(52) U.S. Cl.
    CPC ................................. G06N 10/60 (2022.01)
(58) Field of Classification Search
    CPC ...................................................... G06N 10/60
    See application file for complete search history.

(56) References Cited

U.S. PATENT DOCUMENTS

| 7,113,967 B2 | 9/2006 | Cleve et al. |
| 8,957,699 B2 | 2/2015 | Eastin |
| (Continued) | | |

FOREIGN PATENT DOCUMENTS

| EP | 3417403 A1 | 12/2018 |
| JP | H08227682 A | 9/1996 |
| WO | 2017/143195 A1 | 8/2017 |

OTHER PUBLICATIONS

Non Final Office Action received for U.S. Appl. No. 16/833,076 dated Oct. 12, 2023, 188 pages.

(Continued)

*Primary Examiner* — Kurtis R Bahr
(74) *Attorney, Agent, or Firm* — Amin, Turocy & Watson, LLP

(57) ABSTRACT

Systems, computer-implemented methods, and computer program products to facilitate quantum state preparation of a probability distribution to perform amplitude estimation are provided. According to an embodiment, a system can comprise a memory that stores computer executable components and a processor that executes the computer executable components stored in the memory. The computer executable components can comprise a data loader component that prepares a quantum state of a probability distribution based on structure of a quantum amplitude estimation algorithm. The computer executable components can further comprise an operator component that constructs a quantum operator based on the quantum state to perform quantum amplitude estimation.

25 Claims, 10 Drawing Sheets

(56) References Cited

U.S. PATENT DOCUMENTS

| | | | |
|---|---|---|---|
| 11,734,598 | B2* | 8/2023 | Woerner ............... G06N 10/60 706/52 |
| 2016/0004976 | A1 | 1/2016 | Chattopadhyay et al. |
| 2016/0314406 | A1 | 10/2016 | Wiebe et al. |
| 2019/0251213 | A1 | 8/2019 | Bishop et al. |
| 2019/0258696 | A1 | 8/2019 | Burchard |
| 2019/0378208 | A1 | 12/2019 | Woerner et al. |
| 2020/0394276 | A1* | 12/2020 | Woerner ............... G06N 10/00 |
| 2021/0049493 | A1* | 2/2021 | Vivoli ................. G06N 10/00 |
| 2021/0182721 | A1* | 6/2021 | Li ........................ G06N 10/00 |

OTHER PUBLICATIONS

Notice of Allowance received for U.S. Appl. No. 16/833,076 dated Feb. 7, 2024, 171 pages.

Suzuki et al., "Amplitude Estimation without Phase Estimation," arXiv: 1904.10246v1 [quant-ph], Apr. 23, 2019, 16 pages.

Orus et al., "Quantum computing for finance: overview and prospects," arXiv: 1807.03890v2 [quant-ph], Feb. 22, 2019, 13 pages.

Gilyen et al., "Optimizing quantum optimization algorithms via faster quantum gradient computation," In Proceedings of the 30th ACM-SIAM Symposium on Discrete Algorithms (SODA 2019), Jan. 2019, 20 pages.

Disclosed Anonymously, "Method for applying amplitude Q compensation to angle stacks and pre-stack gathers," An IP.com Prior Art Database Technical Disclosure, IP.com No. IPCOM000250062D, May 24, 2017, 12 pages.

Disclosed Anonymously, "Fit for Purpose Processing in the Quantum World," An IP.com Prior Art Database Technical Disclosure, IP.com No. IPCOM000255049D, Aug. 28, 2018, 7 pages.

Brassard, et al., Quantum Amplitude Amplification and Estimation, May 2, 2000, 32 Pages.

Montanaro, Proceedings of the Royal Society A: Mathematical, Physical and Engineering Sciences, Jul. 21, 2015, 20 Pages.

Rebentrost, et al., Quantum computational finance: Monte Carlo pricing of financial derivatives, Aug. 21, 2018, 17 pages.

Woerner, et al., Quantum risk analysis, Feb. 8, 2019, 17 pages.

Egger, et al., Credit Risk Analysis using Quantum Computers, Jul. 9, 2019, 8 pages.

Abrams, et al., Fast quantum algorithms for numerical integrals and stochastic processes, Aug. 28, 1999, 15 Pages.

Shende, et al., Synthesis of Quantum Logic Circuits, IEEE Transactions on Computer-Aided Design of Integrated Circuits and Systems, Apr. 18, 2006, 19 pages.

Plesch, et al., Quantum State Preparation with Universal Gate Decompositions, Jan. 17, 2011, 5 pages.

Grover, et al., Creating superpositions that correspond to efficiently integrable probability distributions, Aug. 15, 2002, 2 pages.

Zoufal, et al., Quantum Generative Adversarial Networks for Learning and Loading Random Distributions, Sep. 30, 2019, Oct. 1, 2019, 14 pages.

Harrow, et al., Quantum algorithm for linear systems of equations, Sep. 30, 2009, 15 pages.

Glasserman, Monte Carlo Methods in Financial Engineering, 2004, 613 pages.

Aleksandrowicz, et al., Qiskit: An open-source framework for quantum computing, https://qiskitorg/, Last accessed Nov. 1, 2019, 3 pages.

Mel, et al., The NIST Definition of Cloud Computing, National Institute of Standards and Technology Special Publication 800-145, Sep. 2011, 7 Pages.

Appendix P: IBM Patents or Patent Applications treated as related.

Non Final Office Action received for U.S. Appl. No. 16/671,796 dated Aug. 10, 2022, 33 pages.

Non Final Office Action received for U.S. Appl. No. 16/833,076 dated Oct. 13, 2022, 119 pages.

Final Office Action received for U.S. Appl. No. 16/671,796 dated Jan. 10, 2023, 15 pages.

Notice of Allowance received for U.S. Appl. No. 16/671,796 dated Mar. 14, 2023, 21 pages.

U.S. Appl. No. 16/671,796, filed Nov. 1, 2019.

Non Final Office Action received for U.S. Appl. No. 16/833,076 dated May 17, 2023, 117 pages.

Rebentrost et al., "Quantum Computational Finance: Monte Carlo Pricing of Financial Derivatives", Physical Review A 98, American Physical Society, Aug. 20, 2018, 15 pages.

Ramos-Calderer et al., "Quantum Unary Approach to Option Pricing", arXiv: 1912.01618v4, Mar. 16, 2021, 24 pages.

Montanaro, Ashley, "Quantum Speedup of Monte Carlo Methods" Proceedings of the Royal Society A, vol. 471, 2015, 20 pages.

Aaronson et al., "Quantum Approximate Counting, Simplified", arxiv: 1908.10846v6, Nov. 3, 2021, 13 pages.

Grinko et al., "Iterative Quantum Amplitude Estimation", arxiv:1912. 05559v3, Apr. 19, 2021, 13 pages.

Stamatopoulos et al., "Option Pricing Using Quantum Computers", arxiv: 1905.02666v5, Quantum, CC-BY 4.0, Jul. 2, 2020, 20 pages.

Das et al., "Quantum-mechanical Analysis of Spin-echo Phenomena", The Royal Society Publishing, vol. 227, No. 1170, Jan. 20, 1955, pp. 407-421.

* cited by examiner

QUANTUM STATE PREPARATION OF A PROBABILITY DISTRIBUTION FACILITATING QUANTUM AMPLITUDE ESTIMATION

BACKGROUND

The subject disclosure relates to quantum state preparation, and more specifically, to quantum state preparation of a probability distribution facilitating quantum amplitude estimation.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, computer-implemented methods, and/or computer program products that facilitate quantum state preparation of a probability distribution to perform amplitude estimation are described.

According to an embodiment, a system can comprise a memory that stores computer executable components and a processor that executes the computer executable components stored in the memory. The computer executable components can comprise a data loader component that prepares a quantum state of a probability distribution based on structure of a quantum amplitude estimation algorithm. The computer executable components can further comprise an operator component that constructs a quantum operator based on the quantum state to perform quantum amplitude estimation.

According to another embodiment, a computer-implemented method can comprise preparing, by a system operatively coupled to a processor, a quantum state of a probability distribution based on structure of a quantum amplitude estimation algorithm. The computer-implemented method can further comprise constructing, by the system, a quantum operator based on the quantum state to perform quantum amplitude estimation.

According to another embodiment, a computer program product facilitating a quantum state preparation of a probability distribution process to perform amplitude estimation is provided. The computer program product comprising a computer readable storage medium having program instructions embodied therewith, the program instructions executable by a processor to cause the processor to prepare, by the processor, a quantum state of a probability distribution based on structure of a quantum amplitude estimation algorithm. The program instructions are further executable by the processor to cause the processor to construct, by the processor, a quantum operator based on the quantum state to perform quantum amplitude estimation.

According to an embodiment, a system can comprise a memory that stores computer executable components and a processor that executes the computer executable components stored in the memory. The computer executable components can comprise an estimation component that performs quantum amplitude estimation based on a reversible quantum operator applied to a quantum state of a probability distribution. The computer executable components can further comprise an error reduction component that performs numerical integration based on the quantum amplitude estimation to reduce an approximation error yielded by the quantum amplitude estimation.

According to another embodiment, a computer-implemented method can comprise performing, by a system operatively coupled to a processor, quantum amplitude estimation based on a reversible quantum operator applied to a quantum state of a probability distribution. The computer-implemented method can further comprise performing, by the system, numerical integration based on the quantum amplitude estimation to reduce an approximation error yielded by the quantum amplitude estimation.

DETAILED DESCRIPTION

Figure 1:
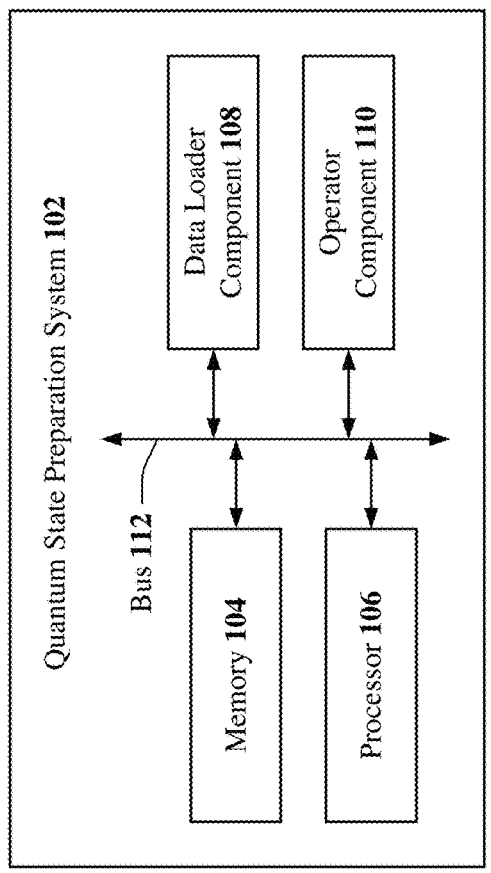
FIG. 1 illustrates a block diagram of an example, non-limiting system that can facilitate quantum state preparation of a probability distribution to perform amplitude estimation in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Quantum computing is generally the use of quantum-mechanical phenomena for the purpose of performing computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1, can entangle multiple quantum bits, and use interference.

Quantum computing has the potential to solve problems that, due to their computational complexity, cannot be solved, either at all or for all practical purposes, on a classical computer. However, quantum computing requires very specialized skills to, for example, prepare a quantum state of a probability distribution to perform amplitude estimation.

Quantum amplitude estimation (QAE) is a quantum algorithm that can achieve a quadratic speed-up over classical Monte Carlo simulation. Quantum amplitude estimation has many practical applications such as, for instance, option pricing, risk analysis, numerical integration, and/or another application.

A key to applying QAE is efficient data loading. In the present context, this means a quantum circuit polynomial in the number of qubits that prepares a quantum state (also referred to herein as a state) corresponding to a given probability distribution. If state preparation is too expensive (e.g., computationally expensive), it can diminish the quantum advantage.

A problem with some existing technologies that can prepare quantum states of a distribution is that if the probability distribution is given by an arbitrary probability density function, they cannot efficiently (e.g., with relatively low computational costs) prepare the corresponding state and apply QAE to achieve a quantum advantage. Another problem with some existing technologies that can prepare quantum states of a distribution is that they prepare arbitrary quantum states which has exponential complexity with respect to the number of qubits (e.g., an exponential number of gates), and thus, is not efficient and not applicable since it would diminish the quantum advantage.

A problem with some existing technologies that can efficiently (e.g., with relatively low computational costs) prepare quantum states of a distribution is that they can only be implemented to prepare quantum states corresponding to log-concave distributions (e.g., as opposed to an arbitrary probability distribution for a random variable where the arbitrary probability distribution is given by an arbitrary probability density function). Another problem with some existing technologies that can efficiently (e.g., with relatively low computational costs) prepare quantum states of a distribution is that they involve employing a machine learning model to train a quantum operator to approximate an unknown distribution underlying given historical data. Another problem with some existing technologies that can efficiently (e.g., with relatively low computational costs) prepare quantum states of a distribution is that they are not reversible (e.g., unitary), as they involve taking measurements of the last qubit repeatedly until observing a |1) state.

FIG. 1 illustrates a block diagram of an example, non-limiting system 100 that can facilitate quantum state preparation of a probability distribution to perform amplitude estimation in accordance with one or more embodiments described herein. System 100 can comprise a quantum state preparation system 102, which can be associated with a cloud computing environment. For example, quantum state preparation system 102 can be associated with cloud computing environment 950 described below with reference to FIG. 9 and/or one or more functional abstraction layers described below with reference to FIG. 10 (e.g., hardware and software layer 1060, virtualization layer 1070, management layer 1080, and/or workloads layer 1090).

Quantum state preparation system 102 and/or components thereof (e.g., data loader component 108, operator component 110, estimation component 202, error reduction component 302, etc.) can employ one or more computing resources of cloud computing environment 950 described below with reference to FIG. 9 and/or one or more functional abstraction layers (e.g., quantum software, etc.) described below with reference to FIG. 10 to execute one or more operations in accordance with one or more embodiments of the subject disclosure described herein. For example, cloud computing environment 950 and/or such one or more functional abstraction layers can comprise one or more classical computing devices (e.g., classical computer, classical processor, virtual machine, server, etc.), quantum hardware, and/or quantum software (e.g., quantum computing device, quantum computer, quantum processor, quantum circuit simulation software, superconducting circuit, etc.) that can be employed by quantum state preparation system 102 and/or components thereof to execute one or more operations in accordance with one or more embodiments of the subject disclosure described herein. For instance, quantum state preparation system 102 and/or components thereof can employ such one or more classical and/or quantum computing resources to execute one or more classical and/or quantum: mathematical function, calculation, and/or equation; computing and/or processing script; algorithm; model (e.g., artificial intelligence (AI) model, machine learning (ML) model, etc.); and/or another operation in accordance with one or more embodiments of the subject disclosure described herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Quantum state preparation system 102 can comprise a memory 104, a processor 106, a data loader component 108, an operator component 110, and/or a bus 112.

It should be appreciated that the embodiments of the subject disclosure depicted in various figures disclosed herein are for illustration only, and as such, the architecture of such embodiments are not limited to the systems, devices, and/or components depicted therein. For example, in some embodiments, system 100 and/or quantum state preparation system 102 can further comprise various computer and/or computing-based elements described herein with reference to operating environment 800 and FIG. 8. In several embodiments, such computer and/or computing-based elements can be used in connection with implementing one or more of the systems, devices, components, and/or computer-implemented operations shown and described in connection with FIG. 1 or other figures disclosed herein.

Memory 104 can store one or more computer and/or machine readable, writable, and/or executable components and/or instructions that, when executed by processor 106 (e.g., a classical processor, a quantum processor, etc.), can facilitate performance of operations defined by the executable component(s) and/or instruction(s). For example, memory 104 can store computer and/or machine readable, writable, and/or executable components and/or instructions that, when executed by processor 106, can facilitate execution of the various functions described herein relating to quantum state preparation system 102, data loader component 108, operator component 110, and/or another component associated with quantum state preparation system 102 (e.g., estimation component 202, error reduction component 302, etc.), as described herein with or without reference to the various figures of the subject disclosure.

Memory 104 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 104 are described below with reference to system memory 816 and FIG. 8. Such examples of memory 104 can be employed to implement any embodiments of the subject disclosure.

Processor 106 can comprise one or more types of processors and/or electronic circuitry (e.g., a classical processor, a quantum processor, etc.) that can implement one or more computer and/or machine readable, writable, and/or executable components and/or instructions that can be stored on memory 104. For example, processor 106 can perform various operations that can be specified by such computer and/or machine readable, writable, and/or executable components and/or instructions including, but not limited to, logic, control, input/output (I/O), arithmetic, and/or the like. In some embodiments, processor 106 can comprise one or more central processing unit, multi-core processor, microprocessor, dual microprocessors, microcontroller, System on a Chip (SOC), array processor, vector processor, quantum processor, and/or another type of processor. Further examples of processor 106 are described below with reference to processing unit 814 and FIG. 8. Such examples of processor 106 can be employed to implement any embodiments of the subject disclosure.

Quantum state preparation system 102, memory 104, processor 106, data loader component 108, operator component 110, and/or another component of quantum state preparation system 102 as described herein (e.g., estimation component 202, error reduction component 302, etc.) can be communicatively, electrically, operatively, and/or optically coupled to one another via a bus 112 to perform functions of system 100, quantum state preparation system 102, and/or any components coupled therewith. Bus 112 can comprise one or more memory bus, memory controller, peripheral bus, external bus, local bus, a quantum bus, and/or another type of bus that can employ various bus architectures. Further examples of bus 112 are described below with reference to system bus 818 and FIG. 8. Such examples of bus 112 can be employed to implement any embodiments of the subject disclosure.

Quantum state preparation system 102 can comprise any type of component, machine, device, facility, apparatus, and/or instrument that comprises a processor and/or can be capable of effective and/or operative communication with a wired and/or wireless network. All such embodiments are envisioned. For example, quantum state preparation system 102 can comprise a server device, a computing device, a general-purpose computer, a special-purpose computer, a quantum computing device (e.g., a quantum computer), a tablet computing device, a handheld device, a server class computing machine and/or database, a laptop computer, a notebook computer, a desktop computer, a cell phone, a smart phone, a consumer appliance and/or instrumentation, an industrial and/or commercial device, a digital assistant, a multimedia Internet enabled phone, a multimedia players, and/or another type of device.

Quantum state preparation system 102 can be coupled (e.g., communicatively, electrically, operatively, optically, etc.) to one or more external systems, sources, and/or devices (e.g., classical and/or quantum computing devices, communication devices, etc.) via a data cable (e.g., High-Definition Multimedia Interface (HDMI), recommended standard (RS) 232, Ethernet cable, etc.). In some embodiments, quantum state preparation system 102 can be coupled (e.g., communicatively, electrically, operatively, optically, etc.) to one or more external systems, sources, and/or devices (e.g., classical and/or quantum computing devices, communication devices, etc.) via a network.

In some embodiments, such a network can comprise wired and wireless networks, including, but not limited to, a cellular network, a wide area network (WAN) (e.g., the Internet) or a local area network (LAN). For example, quantum state preparation system 102 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Zig- bee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wide-band (UWB) standard protocol, and/or other proprietary and non-proprietary communication protocols. In such an example, quantum state preparation system 102 can thus include hardware (e.g., a central processing unit (CPU), a transceiver, a decoder, quantum hardware, a quantum processor, etc.), software (e.g., a set of threads, a set of processes, software in execution, quantum pulse schedule, quantum circuit, quantum gates, etc.) or a combination of hardware and software that facilitates communicating information between quantum state preparation system 102 and external systems, sources, and/or devices (e.g., computing devices, communication devices, etc.).

Quantum state preparation system 102 can comprise one or more computer and/or machine readable, writable, and/or executable components and/or instructions that, when executed by processor 106 (e.g., a classical processor, a quantum processor, etc.), can facilitate performance of operations defined by such component(s) and/or instruction(s). Further, in numerous embodiments, any component associated with quantum state preparation system 102, as described herein with or without reference to the various figures of the subject disclosure, can comprise one or more computer and/or machine readable, writable, and/or executable components and/or instructions that, when executed by processor 106, can facilitate performance of operations defined by such component(s) and/or instruction(s). For example, data loader component 108, operator component 110, and/or any other components associated with quantum state preparation system 102 as disclosed herein (e.g., communicatively, electronically, operatively, and/or optically coupled with and/or employed by quantum state preparation system 102), can comprise such computer and/or machine readable, writable, and/or executable component(s) and/or instruction(s). Consequently, according to numerous embodiments, quantum state preparation system 102 and/or any components associated therewith as disclosed herein, can employ processor 106 to execute such computer and/or machine readable, writable, and/or executable component(s) and/or instruction(s) to facilitate performance of one or more operations described herein with reference to quantum state preparation system 102 and/or any such components associated therewith.

Quantum state preparation system 102 can facilitate performance of operations executed by and/or associated with data loader component 108, operator component 110, and/or another component associated with quantum state preparation system 102 as disclosed herein (e.g., estimation component 202, error reduction component 302, etc.). For example, as described in detail below, quantum state preparation system 102 can facilitate via processor 106 (e.g., a classical processor, a quantum processor, etc.): preparing a quantum state of a probability distribution based on structure of a quantum amplitude estimation algorithm; and/or constructing a quantum operator based on the quantum state to perform quantum amplitude estimation. In another example, quantum state preparation system 102 can further facilitate via processor 106 (e.g., a classical processor, a quantum processor, etc.): applying an objective function of the quantum amplitude estimation algorithm to the quantum state; employing the quantum amplitude estimation algorithm to perform the quantum amplitude estimation based on at least one of the quantum state or the quantum operator; and/or preparing the quantum state of the probability distribution based on structure of the quantum amplitude estimation algorithm to reduce computational costs of the processor in loading arbitrary probability density functions into quantum states to be used in the quantum amplitude estimation algorithm executed on a quantum device. In some embodiments, the probability distribution described above can comprise an arbitrary probability distribution provided by an arbitrary probability density function and the quantum operator described above can comprise a reversible quantum operator (e.g., a unitary quantum operator).

Quantum state preparation system 102 can further facilitate via processor 106 (e.g., a classical processor, a quantum processor, etc.): performing quantum amplitude estimation based on a reversible quantum operator applied to a quantum state of a probability distribution; and/or performing numerical integration based on the quantum amplitude estimation to reduce an approximation error yielded by the quantum amplitude estimation. In another example, quantum state preparation system 102 can further facilitate via processor 106 (e.g., a classical processor, a quantum processor, etc.): preparing the quantum state of the probability distribution based on structure of a quantum amplitude estimation algorithm; constructing the reversible quantum operator based on the quantum state and that applies an objective function of a quantum amplitude estimation algorithm to the quantum state to perform quantum amplitude estimation; and/or preparing the quantum state of the probability distribution based on structure of a quantum amplitude estimation algorithm to reduce computational costs of the processor in loading arbitrary probability density functions into quantum states to be used in the quantum amplitude estimation algorithm executed on a quantum device. In some embodiments, the probability distribution described above can comprise an arbitrary probability distribution provided by an arbitrary probability density function.

To facilitate performance of one or more of the example operations defined above and thereby enable efficient data loading (e.g., distribution loading) such that the quantum advantage of applying QAE can be leveraged, quantum state preparation system 102 and/or the component(s) thereof (e.g., data loader component 108, operator component 110, estimation component 202, error reduction component 302, etc.) can derive and/or execute one or more of the equations (1) to (17) described below. In an example, quantum state preparation system 102 and/or the component(s) thereof (e.g., data loader component 108, operator component 110, estimation component 202, error reduction component 302, etc.) can use Hadamard gates, quantum arithmetic, and/or controlled Y-rotations to derive and/or execute one or more of the equations (1) to (17) described below.

Quantum Amplitude Estimation

As quantum state preparation system 102 and/or the component(s) thereof can facilitate efficient data loading by taking into account the context (e.g., structure) of where it will be used, for instance, in QAE, definition of QAE and a description of the distribution loading problem are provided here with reference to equations (1) to (5). As described above, QAE is a quantum algorithm that can achieve a quadratic speed-up over classical Monte Carlo simulation. A key to applying QAE is efficient data loading. In the present context, this means a quantum circuit polynomial in the number of qubits that prepares a quantum state (also referred to herein as a state) corresponding to a given probability distribution. If state preparation is too expensive (e.g., computationally expensive), it can diminish the quantum advantage of applying QAE.

Suppose a given operator $\mathcal{A}$ acting on n+1 qubits can be defined as:

$$\mathcal{A}|0\rangle_n|0\rangle = \sqrt{1-a}|\psi_0\rangle_n|0\rangle + \sqrt{a}|\psi_1\rangle_n|1\rangle \quad (1)$$

where $\psi_0, \psi_1$ are normalized quantum states, and $a \in [0,1]$ is the probability of measuring the last qubit in state $|1\rangle$. QAE allows estimation of a with a quadratic speed-up over classical Monte Carlo simulation, i.e., the estimation error scales as $\mathcal{O}(1/M)$ if M denotes the number of quantum samples, i.e., applications of $\mathcal{A}$, while for classical Monte Carlo simulation it scales as $\mathcal{O}(1/\sqrt{M})$ for M (classical) samples. More precisely, the estimation error of QAE is given by:

$$\frac{2\pi\sqrt{a(1-a)}}{M} + \frac{\pi^2}{M^2} \quad (2)$$

A common way to construct $\mathcal{A}$ is to first load a probability distribution and then apply a objective function, as outlined in the following. Assume n qubits, a random variables X defined by given probabilities $p_i \in [0,1]$, $i=0, \ldots, 2^n-1$, and a quantum operator $\mathcal{U}$ acting as:

$$\mathcal{U}|0\rangle_n = \sum_{i=0}^{2^n-1} \sqrt{p_i}|i\rangle_n \quad (3)$$

Furthermore, suppose an objective function $g:\{0, \ldots, 2^n-1\} \to [0,1]$, one additional qubit in state $|0\rangle$, and a corresponding quantum operator $\mathcal{G}$ defined by:

$$\mathcal{G}:|i\rangle_n|0\rangle_n(\sqrt{1-g(i)}|0\rangle \times \sqrt{g(i)}|0\rangle + \sqrt{g(i)}|1\rangle) \quad (4)$$

If $\mathcal{A}$ is defined as $\mathcal{A} = \mathcal{G} \cdot \mathcal{U} \otimes \|$, where $\|$ is the identity operator for a single qubit, then the probability of measuring $|1\rangle$ in the last qubit is given by:

$$\sum_{i=0}^{2^n-1} p_i g(i) \quad (5)$$

which is equal to the expected value $\mathbb{E}[g(X)]$.

Thus, if $\mathcal{U}$ and $\mathcal{G}$ can be constructed efficiently (e.g., with relatively low computational costs), a quadratic speed-up can be achieved to estimate $\mathbb{E}[g(X)]$. Quantum state preparation system 102 can efficiently construct $\mathcal{G}$ by computing $\sin^{-1}(\sqrt{g(i)})$ into an ancilla qubit register and using controlled Y-rotations to prepare the amplitude of the objective qubit.

However, as described above, constructing $\mathcal{U}$ is more challenging and can involve an exponential number of gates. As described below, quantum state preparation system 102 (e.g., via data loader component 108, operator component 110, etc.) can construct $\mathcal{U}$ and $\mathcal{G}$ efficiently whenever the probabilities and g are given by a efficiently computable functions.

Efficient State Preparation

An example, non-limiting efficient data loading scheme (also referred to as efficient state preparation) that can be implemented by quantum state preparation system 102 and/or component(s) thereof in accordance with one or more embodiments of the subject disclosure is described here with reference to equations (6) to (12).

In an example, quantum state preparation system 102 (e.g., via data loader component 108, operator component 110, etc.) can apply Hadamard gates to all n state qubits to prepare a simple case of a uniform distribution where $p_i = 1/2^n$.

In another example, quantum state preparation system 102 (e.g., via data loader component 108, operator component 110, etc.) can further apply $\mathcal{G}$ which leads to the state:

$$\frac{1}{\sqrt{2^n}}\sum_{i=0}^{2^n-1}|i\rangle\left(\sqrt{1-g(x_i)}|0\rangle + \sqrt{g(i)}\,|1\rangle\right) \quad (6)$$

In these examples, the probability of measuring |1> in the ancilla qubit can be derived by quantum state preparation system 102 (e.g., via estimation component 202) such that it is equal to:

$$\frac{1}{2^n}\sum_{i=0}^{2^n-1}g(x_i) \quad (7)$$

which is equal to the left Riemann sum, for example, a $2^n$-point approximation of the integral $$\int_{x=0}^{1}g(x)dx.$$

Note that this type of state preparation usually involves repeating and measurement of the ancilla qubit until a |1> is observed (also known as a Repeat-Until-Success circuit). However, QAE does not involve such repeating and measurement of the ancilla qubit and the resulting state can be used directly.

To facilitate such efficient data loading (e.g., distribution loading) described above, data loader component 108 can prepare a quantum state of a probability distribution based on structure of a quantum amplitude estimation (QAE) algorithm. For example, data loader component 108 can prepare a quantum state of an arbitrary probability distribution given by an arbitrary probability density function (e.g., probability density function $f$ defined below). For instance, data loader component 108 can prepare the quantum state depicted in equation (8) below based on structure of the QAE algorithm defined above with reference to equations (1) to (5).

In an example, suppose a random variable $X \in [0,1]$ and the corresponding probability density function $f: [0,1] \rightarrow [0,1]$. Probability density function $f$ can comprise an arbitrary probability density function that can yield an arbitrary probability distribution.

In some embodiments, quantum state preparation system 102 (e.g., via data loader component 108) can scale $f$ such that $\max_{x \in [0,1]} f(x) \leq 1$. In such embodiments, quantum state preparation system 102 (e.g., data loader component 108) can further re-scale the estimated value accordingly at the end of the QAE algorithm.

Utilizing one of the approaches outlined above with reference to equations (1) to (5) to construct $\mathcal{G}$, data loader component 108 can prepare an operator $\mathcal{F}$ defined below in equation (8). For example, data loader component 108 can prepare a quantum state of a probability distribution (e.g., an arbitrary probability distribution provided by an arbitrary probability density function such as, for instance, probability density function $f$) based on structure of the QAE algorithm by preparing an operator $\mathcal{F}$ such that:

$$\mathcal{F}: |i\rangle_n|0\rangle \mapsto |i\rangle_n\left(\sqrt{(1-f(x_i))/2}\,|0\rangle + \sqrt{(1+f(x_i))/2}\,|1\rangle\right) \quad (8)$$

where data loader component 108 can set $x_i = i/2^n$.

It should be appreciated that data loader component 108 can prepare the quantum state of the probability distribution based on structure of the QAE algorithm as described above to reduce computational costs of a processor (e.g., processor 106) in loading arbitrary probability density functions into quantum states to be used in the QAE algorithm executed on a quantum device (e.g., a quantum processor, quantum computer, etc.). Based on such reduced computational costs associated with loading probability distributions into quantum states to use the QAE algorithm, it should be further appreciated that data loader component 108 can thereby facilitate extended practical application of the QAE algorithm.

To further facilitate such efficient data loading (e.g., distribution loading) described above, operator component 110 can construct a quantum operator based on a quantum state to perform QAE. For example, operator component 110 can construct a quantum operator based on the quantum state prepared by data loader component 108 as described above. In another example, operator component 110 can construct a quantum operator $\mathcal{G}$ as described below with reference to equations (9) to (11), where operator component 110 can apply an objective function of the QAE algorithm to the quantum state. For instance, operator component 110 can construct a quantum operator $\mathcal{G}$ as described below with reference to equations (9) to (11), where operator component 110 can apply objective function g to the quantum state. In another example, operator component 110 can construct a quantum operator $\mathcal{G}$ as described below with reference to equations (9) to (11), where quantum operator $\mathcal{G}$ can comprise a reversible quantum operator (e.g., a unitary quantum operator).

In an example, operator component 110 can define objective function g as g: $[0,1] \rightarrow [-1,+1]$ (e.g., in contrast to $[0,1]$ used previously) and can construct a quantum operator $\mathcal{G}$ (e.g., a reversible quantum operator) slightly different than before:

$$\mathcal{G}: |i\rangle_n|j\rangle|0\rangle \mapsto \begin{cases} |i\rangle_n|0\rangle\left(\sqrt{(1+g(x_i))/2}\,|0\rangle + \sqrt{(1-g(x_i))/2}\,|1\rangle\right), & \text{if } j=0 \\ |i\rangle_n|1\rangle\left(\sqrt{(1-g(x_i))/2}\,|0\rangle + \sqrt{(1+g(x_i))/2}\,|1\rangle\right), & \text{if } j=1. \end{cases} \quad (9)$$

In another example, data loader component 108 can prepare operator $\mathcal{F}$ to prepare the first ancilla qubit, which can then be used by quantum state preparation system 102 (e.g., via data loader component 108 and/or operator component 110) as a control qubit to realize the condition in quantum operator $\mathcal{G}$.

In another example, quantum state preparation system 102 (e.g., via data loader component 108 and/or operator component 110) can prepare the state:

$$\frac{1}{\sqrt{2^n}}\sum_{i=0}^{2^n-1}|i\rangle_n|0\rangle|0\rangle \quad (10)$$

In another example, quantum state preparation system 102 (e.g., via data loader component 108 and/or operator component 110) can use Hadamard gates on the first n qubits, and further apply $\mathcal{F} \otimes \mathbb{I}$ and $\mathcal{G}$ to get the state:

$$\frac{1}{\sqrt{2^n}} \sum_{i=0}^{2^n-1} |i\rangle_n |0\rangle \quad (11)$$

$$\sqrt{(1-f(x_i))/2} \left( \sqrt{(1+g(x_i))/2} \, |0\rangle + \sqrt{(1-g(x_i))/2} \, |1\rangle \right) +$$

$$\frac{1}{\sqrt{2^n}} \sum_{i=0}^{2^n-1} |i\rangle_n |1\rangle \sqrt{(1+f(x_i))/2} \left( \sqrt{(1-g(x_i))/2} \, |0\rangle + \right.$$

$$\left. \sqrt{(1+g(x_i))/2} \, |1\rangle \right)$$

Based on the examples described above with reference to equations (6) to (11), as described below estimation component 202 can employ the QAE algorithm and/or one or more of equations (6) to (11) to perform quantum amplitude estimation.

Figure 2:
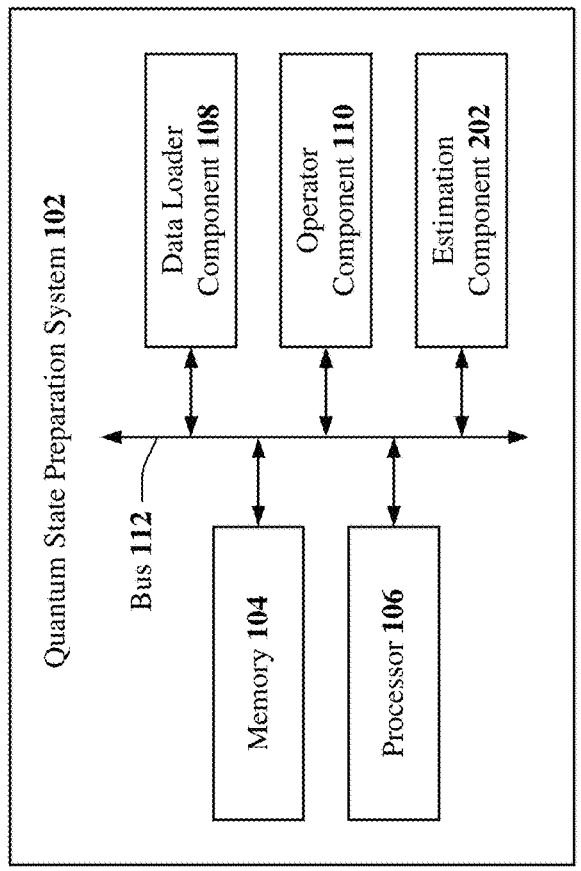
FIG. 2 illustrates a block diagram of an example, non-limiting system that can facilitate quantum state preparation of a probability distribution to perform amplitude estimation in accordance with one or more embodiments described herein.

FIG. 2 illustrates a block diagram of an example, non-limiting system 200 that can facilitate quantum state preparation of a probability distribution to perform amplitude estimation in accordance with one or more embodiments described herein. System 200 can comprise quantum state preparation system 102. In some embodiments, system 200 can comprise an estimation component 202. Repetitive description of like elements and/or processes employed in respective embodiments is omitted for sake of brevity.

Estimation component 202 can employ the QAE algorithm defined above to perform quantum amplitude estimation based on at least one of a quantum state or a quantum operator. For example, estimation component 202 can employ the QAE algorithm and/or one or more of equations (6) to (11) defined above to perform quantum amplitude estimation based on the quantum state prepared by data loader component 108 and/or the quantum operator constructed by operator component 110 as described above.

Based on estimation component 202 employing the QAE algorithm and/or one or more of equations (6) to (11) defined above to perform quantum amplitude estimation based on the quantum state prepared by data loader component 108 and/or the quantum operator constructed by operator component 110, estimation component 202 can utilize equation (12) defined below to determine the probability of measuring |1⟩ for the last qubit which can be given by:

$$\frac{1}{2^n} \sum_{i=0}^{2^n-1} \frac{(1-f(x_i))(1-g(x_i))}{4} + \frac{1}{2^n} \sum_{i=0}^{2^n-1} \frac{(1+f(x_i))(1+g(x_i))}{4} = \quad (12)$$

$$\frac{1}{2} \left( 1 + \frac{1}{2^n} \sum_{i=0}^{2^n-1} f(x_i) g(x_i) \right)$$

Again, the sum over i is equal to a Riemann sum and can be used by estimation component 202 to approximate the expected value $\mathbb{E}[g(X)]$. Thus, in embodiments where estimation component 202 uses QAE to estimate a (e.g., the probability of measuring |1⟩ for the last qubit), then 2a−1 can be used by estimation component 202 as an estimate for $\mathbb{E}[g(X)]$, which can enable quantum state preparation system 102 to achieve a quadratic speed-up over classical Monte Carlo simulation. Estimation component 202 could also directly compute $f(x_i)g(x_i)$ and compute the resulting integral, however, having the individual quantum circuits for $f$ and $g$ can be cheaper in terms of qubits and gates then if estimation component 202 also computes the product of the two using quantum arithmetic.

So far, the subject disclosure has focused on univariate problems. It is straight-forward to extend the approach described above to multivariate problems as well. For example, quantum state preparation system 102 can extend the approach described above to multivariate problems as well by representing the dimensions by separate quantum registers, where each quantum register has a different number of qubits. The number of qubits will scale linearly in the dimension, unlike classical numerical integration schemes where the dependence is usually exponential. As described below with reference to equations (13) to (17), quantum state preparation system 102 can employ error reduction component 302 to analyze the resulting estimation error with respect to the number of qubits used to discretize the support of $f$ and $g$.

Figure 3:
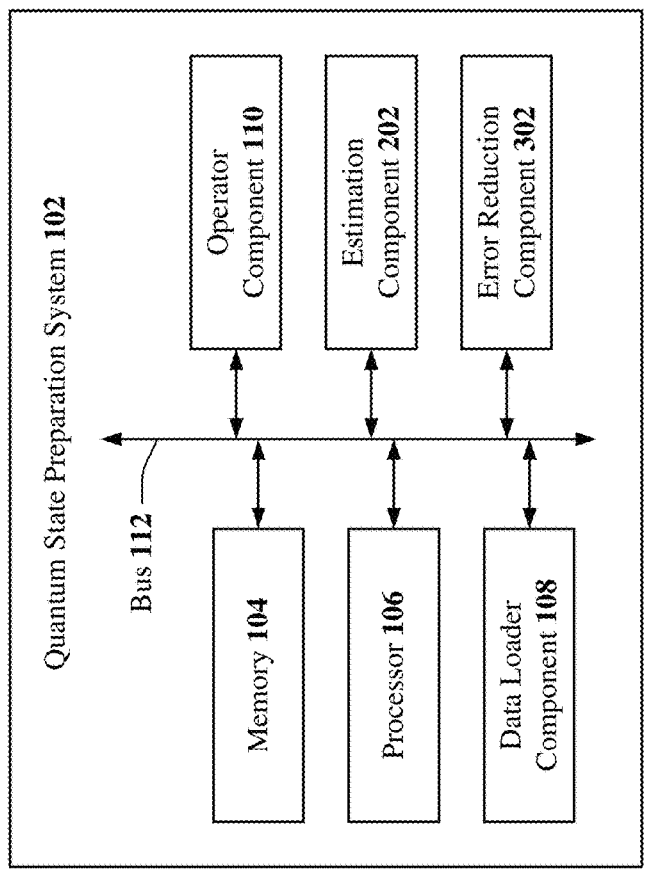
FIG. 3 illustrates a block diagram of an example, non-limiting system that can facilitate quantum state preparation of a probability distribution to perform amplitude estimation in accordance with one or more embodiments described herein.

FIG. 3 illustrates a block diagram of an example, non-limiting system 300 that can facilitate quantum state preparation of a probability distribution to perform amplitude estimation in accordance with one or more embodiments described herein. System 300 can comprise quantum state preparation system 102. In some embodiments, system 300 can comprise an error reduction component 302. Repetitive description of like elements and/or processes employed in respective embodiments is omitted for sake of brevity.

Error Analysis & Higher Order Schemes

An example, non-limiting approximation error reduction scheme that can be implemented by quantum state preparation system 102 and/or component(s) thereof (e.g., via error reduction component 302) in accordance with one or more embodiments of the subject disclosure is described here with reference to equations (13) to (17).

In some embodiments, quantum state preparation system 102 can employ error reduction component 302 to: a) link QAE to numerical integration; b) analyze the approximation error resulting from a discretization using n qubits (denoted by $E_n$); and/or c) reduce this approximation error without increasing the number of qubits used. For example, quantum state preparation system 102 can employ error reduction component 302 to perform numerical integration based on the quantum amplitude estimation performed by estimation component 202 as described above to reduce an approximation error yielded by the quantum amplitude estimation. To do so, error reduction component 302 can add the discretization error on top of the QAE estimation error, since estimation component 202 can perform QAE to obtain only a discrete approximation, not an estimate of the exact value. Taking into account that estimation component 202 can perform QAE to estimate a and 2a−1 is what estimation component 202 aims to estimate, the total resulting error can be bounded by:

$$E_n + \frac{2}{M} + O(1/M^2) \quad (13)$$

where error reduction component 302 can exploit that the QAE estimation error determined by estimation component 202 achieves its maximum for a=1/2.

By leveraging (e.g., implementing) different approaches from numerical integration allows error reduction component 302 to trade off classical repetition of QAE with the resulting estimation error $E_n$.

Suppose n qubits are used (e.g., by quantum state preparation system 102 and/or component(s) thereof) to discretize the support of $f$ and $g$, (e.g., suppose quantum state preparation system 102 and/or component(s) thereof use $2^n$ equally-spaced grid points in [0,1]). Error reduction component 302 can denote the left Riemann sum by $R_n^{left}$, where error reduction component 302 can index using the number of qubits n instead of the number of grid points $2^n$. For simplicity, error reduction component 302 can perform such operations described here based on an assumption that $f$ and $g$ are analytical functions (e.g., continuously differentiable).

For $R_n^{left}$ the estimation error $E_n^{left}$, that can be defined by error reduction component 302 as:

$$E_n = |\mathbb{E}[g(X)] - R_n^{left}| \quad (14)$$

can be bounded by error reduction component 302 using:

$$E_n \leq \frac{\max_{x \in [0,1]} |f(x)g(x)|}{2^n} \quad (15)$$

In other words, error reduction component 302 can employ equation (14) and/or (15) to exponentially decrease the estimation error with the number of qubits.

In another example, if error reduction component 302 defines $x_i = (i+1/2)/2^n$ instead, error reduction component 302 will not be evaluating the left Riemann sum, but the Midpoint rule, and error reduction component 302 can denote the result as $R_n^{mid}$. This leads to a better scaling, and the estimation error Enid can be bounded by error reduction component 302 using:

$$E_n^{mid} \leq \frac{\max_{x \in [0,1]} |\partial_x^2 (f(x)g(x))|}{2^{2n}} \quad (16)$$

For example, by utilizing equation (16) defined above, error reduction component 302 can reduce the error quadratically faster than for $R_n^{left}$, while the algorithm has the same complexity and uses the same number of qubits.

In another example, if error reduction component 302 defines $x_i = (i+1)/2^n$ error reduction component 302 will be evaluating the right Riemann sum $R_n^{right}$. In this example, error reduction component 302 can determine the average of $R_n^{left}$ and $R_n^{right}$ which leads to the Trapezoidal rule and the corresponding estimator $R_n^{trapez}$, whose estimation error scales similarly to the one of the Midpoint rule but involves two runs of QAE.

In another example, error reduction component 302 can determine the weighted average of the Trapezoidal rule and the Midpoint rule $(2R_n^{mid} + R_n^{trapez})/3$ which leads to Simpson's rule, and error reduction component 302 can denote the resulting estimator as $R_n^{Simpson}$. Simpson's rule leads to an even better scaling, and the estimation error $E_n^{Simpson}$ can be bounded by error reduction component 302 using:

$$E_n^{Simpson} \leq \frac{1}{2880} \frac{\max_{x \in [0,1]} |\partial_x^4 (f(x)g(x))|}{2^{4n}} \quad (17)$$

For example, by running QAE three times (e.g., by employing estimation component 202), error reduction component 302 can significantly improve the estimation error. In other examples, estimation component 202 can utilize other quadrature rules for numerical integration (e.g., Romberg's method/Richardson extrapolation), which can lead to even higher orders of convergence, while keeping the number of grid points and number of qubits constant.

In some embodiments, quantum state preparation system 102 (e.g., via data loader component 108, operator component 110, estimation component 202, and/or error reduction component 302) can extend the efficient data loading scheme and/or the approximation error reduction scheme described above with reference to equations (6) to (17) to non-equidistant grids. Application of such schemes to non-equidistant grids can enable use of more advanced quadrature schemes to improve the performance such as, for instance, Gaussian quadrature. However, such application implies that quantum state preparation system 102 first computes the grid points using quantum arithmetic before evaluating the functions $f$ and $g$, which leads to longer circuits than equidistant grids, making a comparison of the performance more difficult.

Based on the examples described above, it should be appreciated that quantum state preparation system 102 can provide a new approach to efficiently load probability distribution functions for QAE and/or utilize techniques from numerical integration to reduce the approximation error while keeping the number of qubits constant. This is a significant enhancement of the state-of-the-art, since quantum state preparation system 102 can perform such operations described above using probability distribution functions that are no log-concave and does not impose any other restrictions on their structure other than being efficiently computable. It should also be appreciated that by performing the efficient data loading scheme and/or the approximation error reduction scheme described above with reference to equations (6) to (17), quantum state preparation system 102 can operate more efficiently than a systems that implements the loading scheme for log-concave functions, since quantum state preparation system 102 only evaluates the function once using quantum arithmetic. The improvements demonstrated in the examples described above with reference to equations (6) to (17) are possible because quantum state preparation system 102 does not treat state preparation separately, but rather in the context of QAE (e.g., together with the algorithm where the prepared state will be used).

Quantum state preparation system 102 can be associated with various technologies. For example, quantum state preparation system 102 can be associated with quantum computing technologies, quantum state preparation technologies, quantum hardware and/or software technologies, quantum algorithm technologies, quantum amplitude estimation technologies, machine learning technologies, artificial intelligence technologies, cloud computing technologies, and/or other technologies.

Quantum state preparation system 102 can provide technical improvements to systems, devices, components, operational steps, and/or processing steps associated with the various technologies identified above. For example, quantum state preparation system 102 can prepare a quantum state of a probability distribution based on structure of a quantum amplitude estimation algorithm to reduce computational costs of a processor in loading arbitrary probability density functions into quantum states to be used in the quantum amplitude estimation algorithm executed on a quantum device. Such reduction of computational costs associated with loading such functions and/or the distributions they yield can thereby extend practical application of the quantum amplitude estimation algorithm.

Quantum state preparation system 102 can provide technical improvements to a processing unit (e.g., processor 106) associated with a classical computing device and/or a quantum computing device (e.g., a quantum processor, quantum hardware, superconducting circuit, etc.) associated with quantum state preparation system 102. For example, by preparing a quantum state of a probability distribution based on structure of a quantum amplitude estimation algorithm as described above (e.g., with reference to equations (6) to (11)), quantum state preparation system 102 can reduce computational costs of a processor (e.g., processor 106, a quantum processor, etc.) that executes such quantum state preparation (e.g., data loading, distribution loading, etc.) and/or the QAE algorithm.

Based on such reduced computational costs described above, a practical application of quantum state preparation system 102 is that it can be implemented by a quantum computing system and/or administrator (e.g., vendor) operating such a system to perform QAE in a variety of domains and/or on a variety of problems ranging in complexity. For instance, quantum state preparation system 102 can be implemented to facilitate Monte Carlo simulation on a quantum computer, thereby extending its applicability to a variety of domains and/or on a variety of problems ranging in complexity.

It should be appreciated that quantum state preparation system 102 provides a new approach driven by relatively new quantum computing technologies. For example, quantum state preparation system 102 provides a new approach to efficiently load probability distributions to quantum states to perform QAE on a quantum computing device that is driven by currently long and computationally expensive methods used to prepare such quantum states.

Quantum state preparation system 102 can employ hardware or software to solve problems that are highly technical in nature, that are not abstract and that cannot be performed as a set of mental acts by a human. In some embodiments, one or more of the processes described herein can be performed by one or more specialized computers (e.g., a specialized processing unit, a specialized classical computer, a specialized quantum computer, etc.) to execute defined tasks related to the various technologies identified above. Quantum state preparation system 102 and/or components thereof, can be employed to solve new problems that arise through advancements in technologies mentioned above, employment of quantum computing systems, cloud computing systems, computer architecture, and/or another technology.

It is to be appreciated that quantum state preparation system 102 can utilize various combinations of electrical components, mechanical components, and circuitry that cannot be replicated in the mind of a human or performed by a human, as the various operations that can be executed by quantum state preparation system 102 and/or components thereof as described herein are operations that are greater than the capability of a human mind. For instance, the amount of data processed, the speed of processing such data, or the types of data processed by quantum state preparation system 102 over a certain period of time can be greater, faster, or different than the amount, speed, or data type that can be processed by a human mind over the same period of time.

According to several embodiments, quantum state preparation system 102 can also be fully operational towards performing one or more other functions (e.g., fully powered on, fully executed, etc.) while also performing the various operations described herein. It should be appreciated that such simultaneous multi-operational execution is beyond the capability of a human mind. It should also be appreciated that quantum state preparation system 102 can include information that is impossible to obtain manually by an entity, such as a human user. For example, the type, amount, and/or variety of information included in quantum state preparation system 102, data loader component 108, operator component 110, estimation component 202 and/or error reduction component 302 can be more complex than information obtained manually by a human user.

Figure 4:
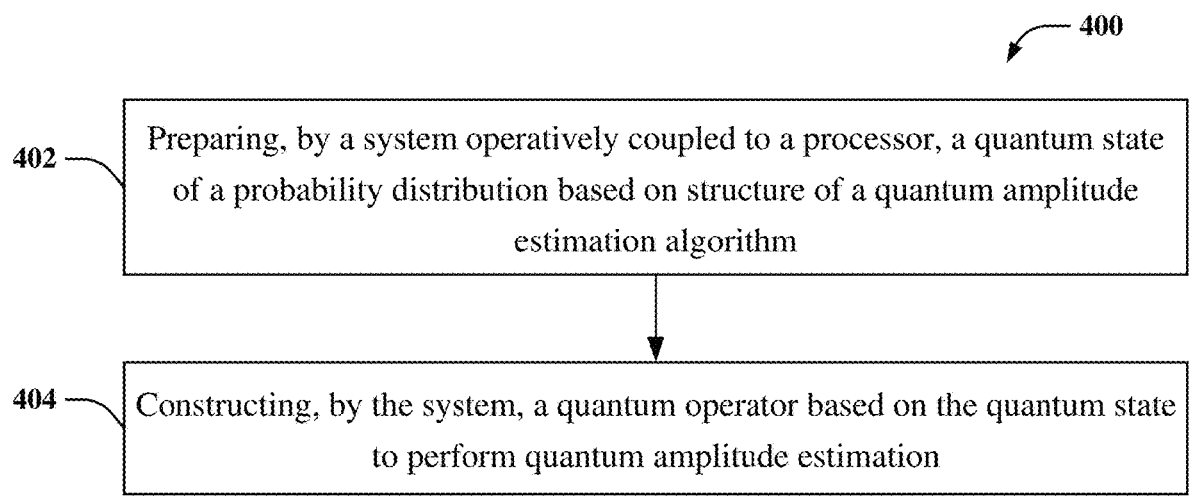
FIG. 4 illustrates a flow diagram of example, non-limiting computer-implemented method that can facilitate quantum state preparation of a probability distribution to perform amplitude estimation in accordance with one or more embodiments described herein.

FIG. 4 illustrates a flow diagram of an example, non-limiting computer-implemented method 400 that can facilitate quantum state preparation of a probability distribution to perform amplitude estimation in accordance with one or more embodiments described herein. Repetitive description of like elements and/or processes employed in respective embodiments is omitted for sake of brevity.

At 402, computer-implemented method 400 can comprise preparing, by a system (e.g., via quantum state preparation system 102 and/or data loader component 108) operatively coupled to a processor (e.g., processor 106, a quantum processor, etc.), a quantum state of a probability distribution based on structure of a quantum amplitude estimation algorithm. For example, quantum state preparation system 102 can employ data loader component 108 and/or the efficient data loading scheme described above with reference to equations (6) to (12) to prepare the quantum state depicted in equation (8) of a probability distribution (e.g., an arbitrary probability distribution given by an arbitrary probability density function), where such quantum state can be constructed by data loader component 108 based on structure of the QAE algorithm.

At 404, computer-implemented method 400 can comprise constructing, by the system (e.g., via quantum state preparation system 102 and/or operator component 110), a quantum operator based on the quantum state to perform quantum amplitude estimation. For example, quantum state preparation system 102 can employ operator component 110 and/or the efficient data loading scheme described above with reference to equations (6) to (12) to construct quantum operator $\mathcal{G}$ based on the quantum state to perform QAE (e.g., via estimation component 202). In this example, quantum operator $\mathcal{G}$ can comprise a reversible quantum operator (e.g., a unitary quantum operator).

Figure 5:
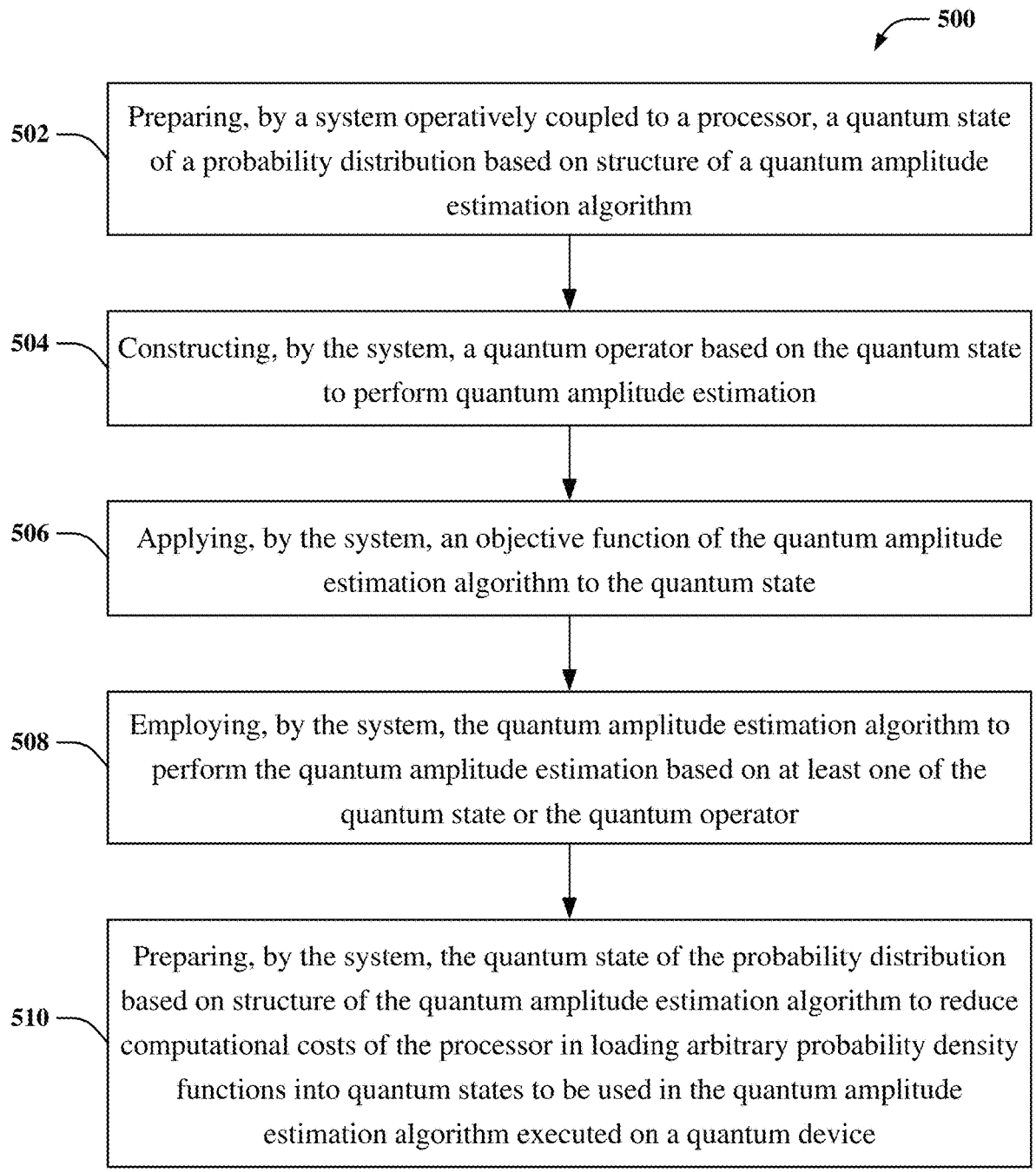
FIG. 5 illustrates a flow diagram of example, non-limiting computer-implemented method that can facilitate quantum state preparation of a probability distribution to perform amplitude estimation in accordance with one or more embodiments described herein.

FIG. 5 illustrates a flow diagram of an example, non-limiting computer-implemented method 500 that can facilitate quantum state preparation of a probability distribution to perform amplitude estimation in accordance with one or more embodiments described herein. Repetitive description of like elements and/or processes employed in respective embodiments is omitted for sake of brevity.

At 502, computer-implemented method 500 can comprise preparing, by a system (e.g., via quantum state preparation system 102 and/or data loader component 108) operatively coupled to a processor (e.g., processor 106, a quantum processor, etc.), a quantum state of a probability distribution based on structure of a quantum amplitude estimation algorithm. For example, quantum state preparation system 102 can employ data loader component 108 and/or the efficient data loading scheme described above with reference to equations (6) to (12) to prepare the quantum state depicted in equation (8) of a probability distribution (e.g., an arbitrary probability distribution given by an arbitrary probability density function), where such quantum state can be constructed by data loader component 108 based on structure of the QAE algorithm.

At 504, computer-implemented method 500 can comprise constructing, by the system (e.g., via quantum state preparation system 102 and/or operator component 110), a quantum operator based on the quantum state to perform quantum amplitude estimation. For example, quantum state preparation system 102 can employ operator component 110 and/or the efficient data loading scheme described above with reference to equations (6) to (12) to construct quantum operator $\mathcal{G}$ based on the quantum state to perform QAE (e.g., via estimation component 202). In this example, quantum operator $\mathcal{G}$ can comprise a reversible quantum operator (e.g., a unitary quantum operator).

At 506, computer-implemented method 500 can comprise applying, by the system (e.g., via quantum state preparation system 102 and/or operator component 110), an objective function of the quantum amplitude estimation algorithm to the quantum state. For example, quantum state preparation system 102 can employ operator component 110 and/or the efficient data loading scheme described above with reference to equations (6) to (12) to apply objective function g of the QAE algorithm to the quantum state (e.g., as depicted in equations (9) to (11)).

At 508, computer-implemented method 500 can comprise employing, by the system (e.g., via quantum state preparation system 102 and/or estimation component 202), the quantum amplitude estimation algorithm to perform the quantum amplitude estimation based on at least one of the quantum state or the quantum operator. For example, quantum state preparation system 102 can employ estimation component 202, the efficient data loading scheme described above with reference to equations (6) to (12), and/or the QAE algorithm to perform quantum amplitude estimation based on the quantum state depicted in equation (8) and/or the quantum operator $\mathcal{G}$ (e.g., as depicted in equations (11) and (12)).

At 510, computer-implemented method 500 can comprise preparing, by the system (e.g., via quantum state preparation system 102 and/or operator component 110), the quantum state of the probability distribution based on structure of the quantum amplitude estimation algorithm to reduce computational costs of the processor in loading arbitrary probability density functions into quantum states to be used in the quantum amplitude estimation algorithm executed on a quantum device.

Figure 6:
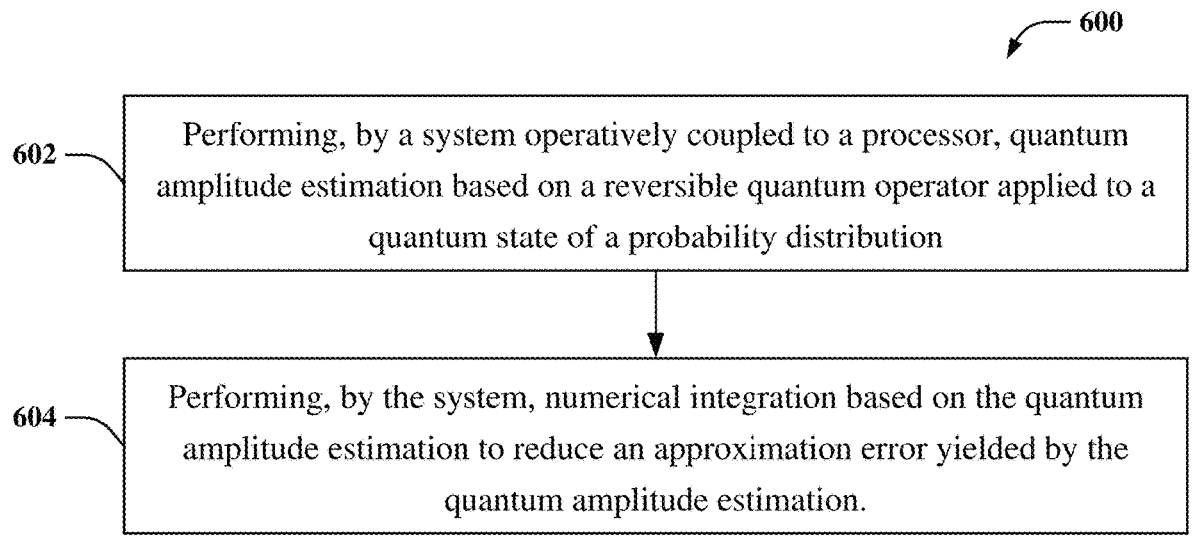
FIG. 6 illustrates a flow diagram of example, non-limiting computer-implemented method that can facilitate quantum state preparation of a probability distribution to perform amplitude estimation in accordance with one or more embodiments described herein.

FIG. 6 illustrates a flow diagram of an example, non-limiting computer-implemented method 600 that can facilitate quantum state preparation of a probability distribution to perform amplitude estimation in accordance with one or more embodiments described herein. Repetitive description of like elements and/or processes employed in respective embodiments is omitted for sake of brevity.

At 602, computer-implemented method 600 can comprise performing, by a system (e.g., via quantum state preparation system 102, data loader component 108, operator component 110, and/or estimation component 202) operatively coupled to a processor (e.g., processor 106, a quantum processor, etc.), quantum amplitude estimation based on a reversible quantum operator applied to a quantum state of a probability distribution. For example, quantum state preparation system 102 can employ data loader component 108, operator component 110, estimation component 202, and/or the efficient data loading scheme described above with reference to equations (6) to (12) to perform quantum amplitude estimation based on a reversible quantum operator such as, for instance, quantum operator $\mathcal{G}$ applied to the quantum state depicted in equation (8) of a probability distribution (e.g., an arbitrary probability distribution given by an arbitrary probability density function).

At 604, computer-implemented method 600 can comprise performing, by a system (e.g., via quantum state preparation system 102 and/or error reduction component 302) numerical integration based on the quantum amplitude estimation to reduce an approximation error yielded by the quantum amplitude estimation. For example, quantum state preparation system 102 can employ error reduction component 302 and/or the approximation error reduction scheme described above with reference to equations (13) to (17) to perform numerical integration based on the quantum amplitude estimation determined by estimation component 202 to reduce an approximation error yielded by the quantum amplitude estimation.

Figure 7:
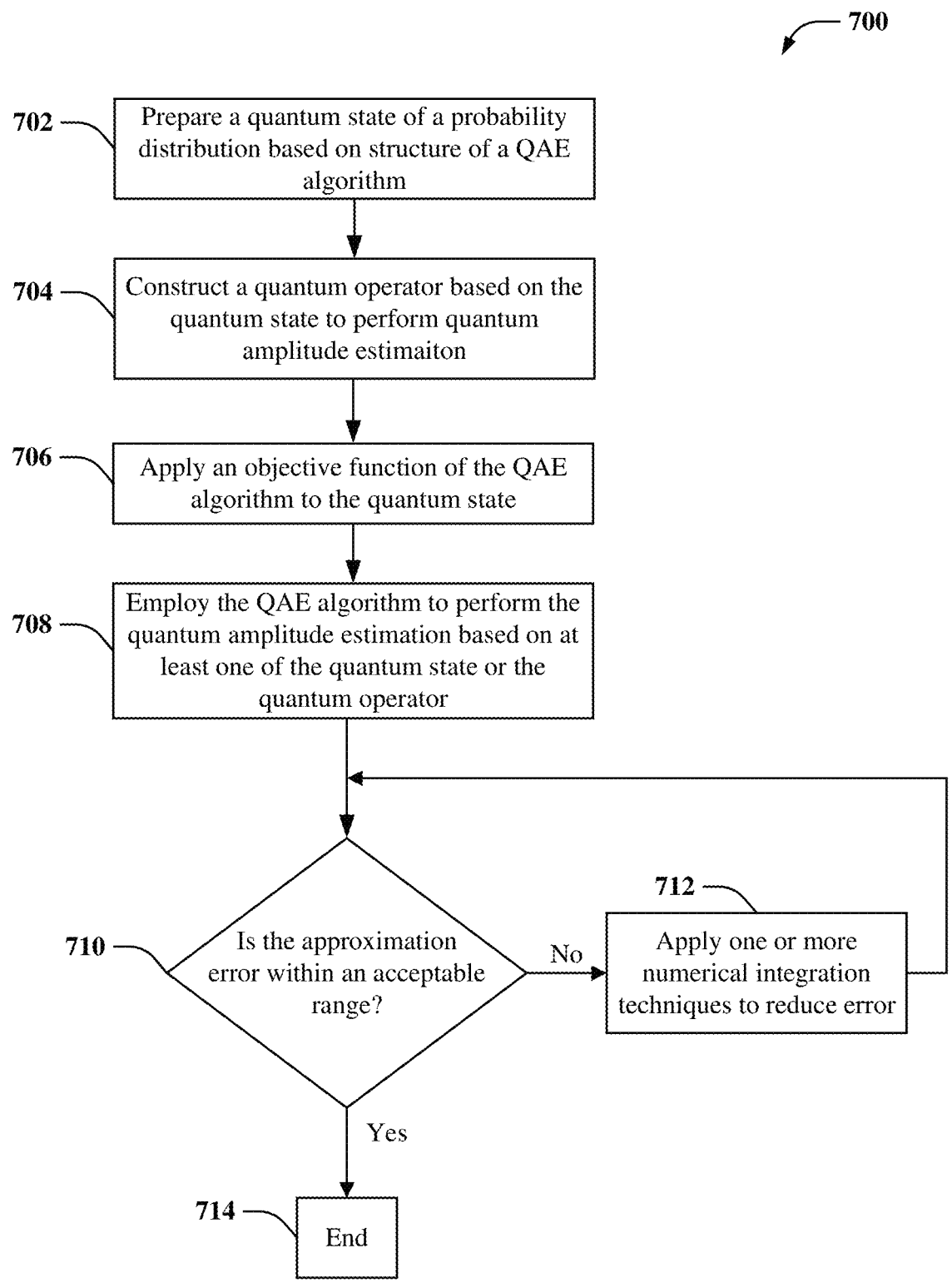
FIG. 7 illustrates a flow diagram of example, non-limiting computer-implemented method that can facilitate quantum state preparation of a probability distribution to perform amplitude estimation in accordance with one or more embodiments described herein.

FIG. 7 illustrates a flow diagram of an example, non-limiting computer-implemented method 700 that can facilitate quantum state preparation of a probability distribution to perform amplitude estimation in accordance with one or more embodiments described herein. Repetitive description of like elements and/or processes employed in respective embodiments is omitted for sake of brevity.

At 702, computer-implemented method 700 can comprise preparing (e.g., via quantum state preparation system 102 and/or data loader component 108) a quantum state of a probability distribution based on structure of a QAE algorithm. For example, quantum state preparation system 102 can employ data loader component 108 and/or the efficient data loading scheme described above with reference to equations (6) to (12) to prepare the quantum state depicted in equation (8) of a probability distribution (e.g., an arbitrary probability distribution given by an arbitrary probability density function), where such quantum state can be constructed by data loader component 108 based on structure of the QAE algorithm.

At 704, computer-implemented method 700 can comprise constructing (e.g., via quantum state preparation system 102 and/or operator component 110) a quantum operator based on the quantum state to perform quantum amplitude estimation. For example, quantum state preparation system 102 can employ operator component 110 and/or the efficient data loading scheme described above with reference to equations (6) to (12) to construct quantum operator $\mathcal{G}$ based on the quantum state to perform QAE (e.g., via estimation component 202). In this example, quantum operator $\mathcal{G}$ can comprise a reversible quantum operator (e.g., a unitary quantum operator).

At 706, computer-implemented method 700 can comprise applying (e.g., via quantum state preparation system 102 and/or operator component 110) an objective function of the quantum amplitude estimation algorithm to the quantum state. For example, quantum state preparation system 102 can employ operator component 110 and/or the efficient data loading scheme described above with reference to equations (6) to (12) to apply objective function g of the QAE algorithm to the quantum state (e.g., as depicted in equations (9) to (11)).

At 708, computer-implemented method 700 can comprise employing (e.g., via quantum state preparation system 102 and/or estimation component 202) the quantum amplitude estimation algorithm to perform the quantum amplitude estimation based on at least one of the quantum state or the quantum operator. For example, quantum state preparation system 102 can employ estimation component 202, the efficient data loading scheme described above with reference to equations (6) to (12), and/or the QAE algorithm to perform quantum amplitude estimation based on the quantum state depicted in equation (8) and/or the quantum operator g (e.g., as depicted in equations (11) and (12)).

At 710, computer-implemented method 700 can comprise determining whether the approximation error corresponding to the expected value approximated by estimation component 202 is within an acceptable range (e.g., a defined range). If it is determined at 710 that the approximation error is not within an acceptable range, at 712, computer-implemented method 700 can comprise applying (e.g., via quantum state preparation system 102 and/or error reduction component 302) one or more numerical integration techniques to reduce the error. For example, quantum state preparation system 102 can employ error reduction component 302 and/or the approximation error reduction scheme described above with reference to equations (13) to (17) to apply at 712 one or more of the numerical integration techniques described above based on the quantum amplitude estimation determined by estimation component 202 to reduce the approximation error yielded by the quantum amplitude estimation. In some embodiments, quantum state preparation system 102 and/or error reduction component 302 can repeat steps 710 and 712 until the approximation error is within an acceptable range. If it is determined at 710 that the approximation error is within an acceptable range, at 714, computer-implemented method 700 can comprise ending (e.g., via quantum state preparation system 102).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 8:
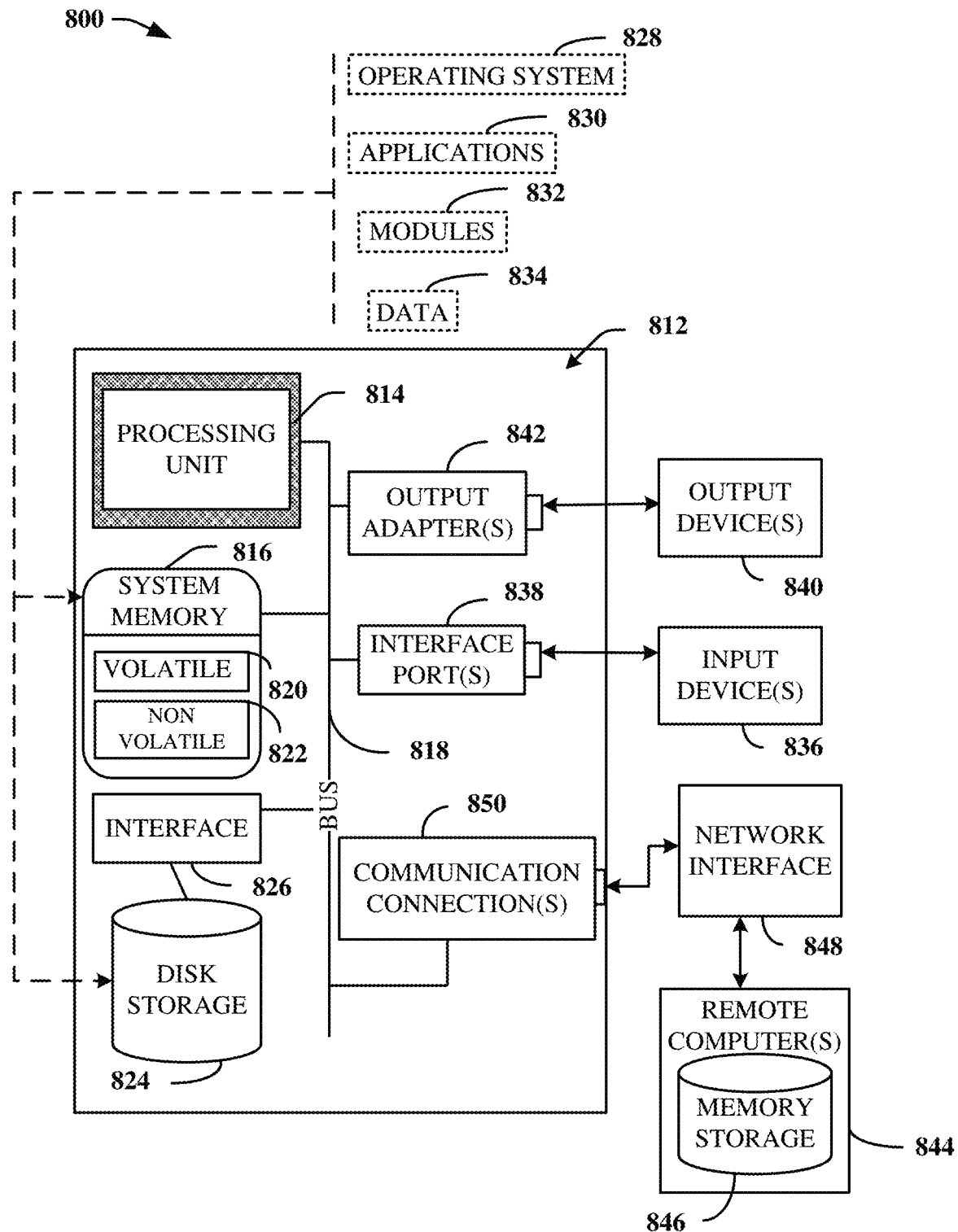
FIG. 8 illustrates a block diagram of an example, non-limiting operating environment in which one or more embodiments described herein can be facilitated.

In order to provide a context for the various aspects of the disclosed subject matter, FIG. 8 as well as the following discussion are intended to provide a general description of a suitable environment in which the various aspects of the disclosed subject matter can be implemented. FIG. 8 illustrates a block diagram of an example, non-limiting operating environment in which one or more embodiments described herein can be facilitated. Repetitive description of like elements employed in other embodiments described herein is omitted for sake of brevity.

With reference to FIG. 8, a suitable operating environment 800 for implementing various aspects of this disclosure can also include a computer 812. The computer 812 can also include a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814. The system bus 818 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 816 can also include volatile memory 820 and nonvolatile memory 822. The basic input/output system (BIOS), containing the basic routines to transfer information between elements within the computer 812, such as during start-up, is stored in nonvolatile memory 822. Computer 812 can also include removable/non-removable, volatile/non-volatile computer storage media. FIG. 8 illustrates, for example, a disk storage 824. Disk storage 824 can also include, but is not limited to, devices like a magnetic disk drive, floppy disk drive, tape drive, Jaz drive, Zip drive, LS-100 drive, flash memory card, or memory stick. The disk storage 824 also can include storage media separately or in combination with other storage media. To facilitate connection of the disk storage 824 to the system bus 818, a removable or non-removable interface is typically used, such as interface 826. FIG. 8 also depicts software that acts as an intermediary between users and the basic computer resources described in the suitable operating environment 800. Such software can also include, for example, an operating system 828. Operating system 828, which can be stored on disk storage 824, acts to control and allocate resources of the computer 812.

System applications 830 take advantage of the management of resources by operating system 828 through program modules 832 and program data 834, e.g., stored either in system memory 816 or on disk storage 824. It is to be appreciated that this disclosure can be implemented with various operating systems or combinations of operating systems. A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port can be used to provide input to computer 812, and to output information from computer 812 to an output device 840. Output adapter 842 is provided to illustrate that there are some output devices 840 like monitors, speakers, and printers, among other output devices 840, which require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a computer, a server, a router, a network PC, a workstation, a microprocessor based appliance, a peer device or other common network node and the like, and typically can also include many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 850 refers to the hardware/software employed to connect the network interface 848 to the system bus 818. While communication connection 850 is shown for illustrative clarity inside computer 812, it can also be external to computer 812. The hardware/software for connection to the network interface 848 can also include, for exemplary purposes only, internal and external technologies such as, modems including regular telephone grade modems, cable modems and DSL modems, ISDN adapters, and Ethernet cards.

Figure 9:
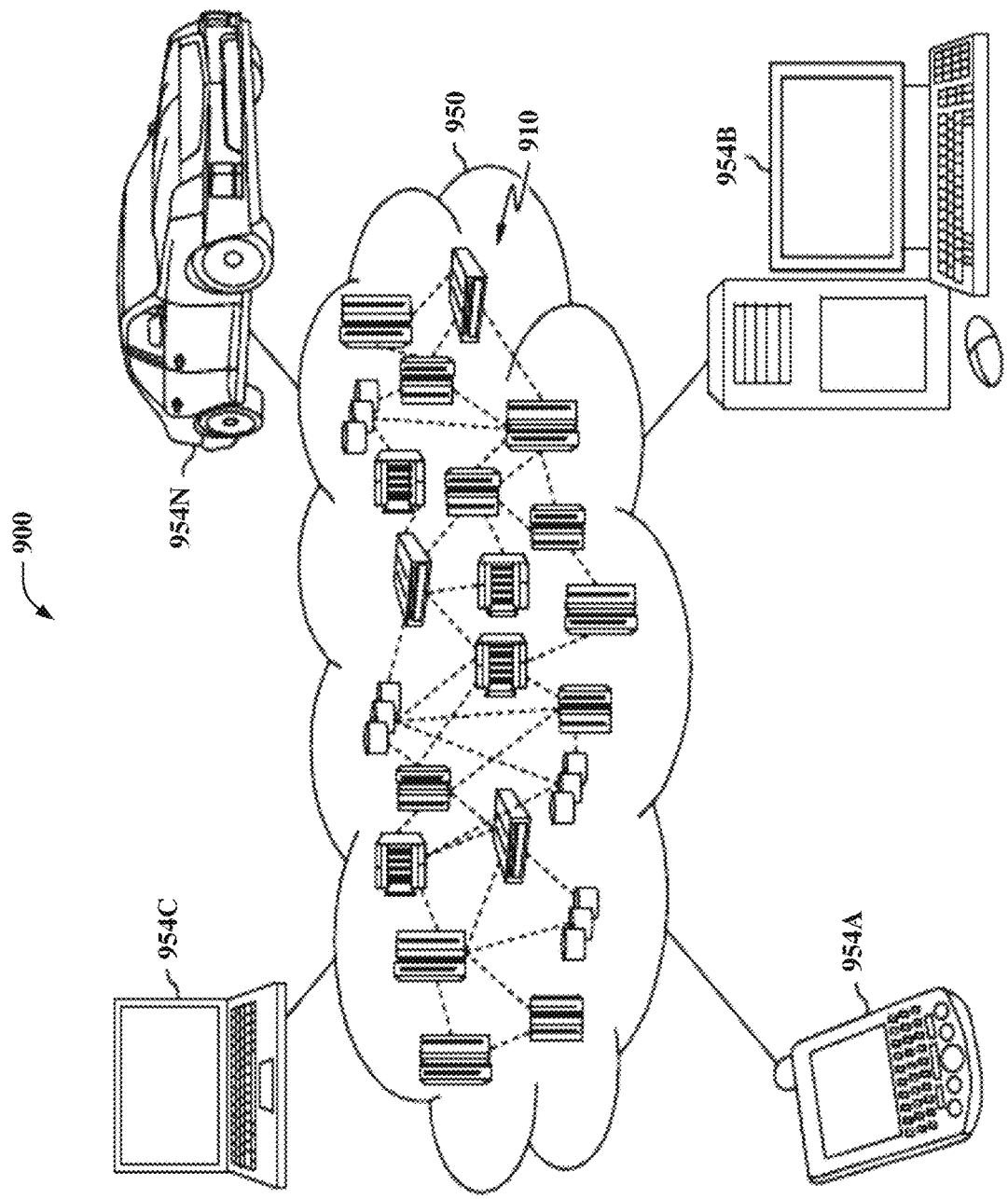
FIG. 9 illustrates a block diagram of an example, non-limiting cloud computing environment in accordance with one or more embodiments of the subject disclosure.

Referring now to FIG. 9, an illustrative cloud computing environment 950 is depicted. As shown, cloud computing environment 950 includes one or more cloud computing nodes 910 with which local computing devices used by cloud consumers, such as, for example, personal digital assistant (PDA) or cellular telephone 954A, desktop computer 954B, laptop computer 954C, and/or automobile computer system 954N may communicate. Although not illustrated in FIG. 9, cloud computing nodes 910 can further comprise a quantum platform (e.g., quantum computer, quantum hardware, quantum software, etc.) with which local computing devices used by cloud consumers can communicate. Nodes 910 may communicate with one another. They may be grouped (not shown) physically or virtually, in one or more networks, such as Private, Community, Public, or Hybrid clouds as described hereinabove, or a combination thereof. This allows cloud computing environment 950 to offer infrastructure, platforms and/or software as services for which a cloud consumer does not need to maintain resources on a local computing device. It is understood that the types of computing devices 954A-N shown in FIG. 9 are intended to be illustrative only and that computing nodes 910 and cloud computing environment 950 can communicate with any type of computerized device over any type of network and/or network addressable connection (e.g., using a web browser).

Figure 10:
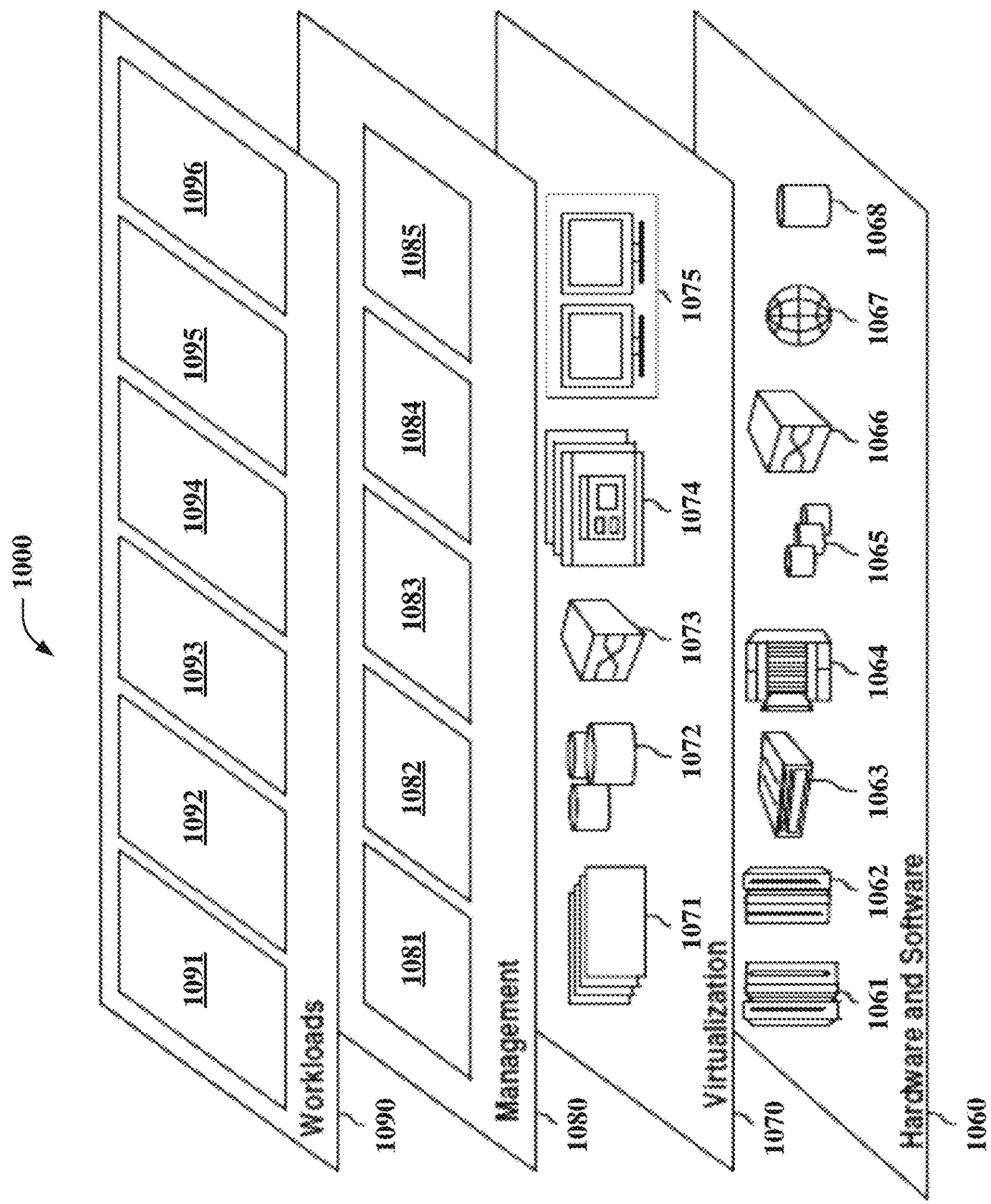
FIG. 10 illustrates a block diagram of example, non-limiting abstraction model layers in accordance with one or more embodiments of the subject disclosure.

Referring now to FIG. 10, a set of functional abstraction layers provided by cloud computing environment 950 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1060 includes hardware and software components. Examples of hardware components include: mainframes 1061; RISC (Reduced Instruction Set Computer) architecture based servers 1062; servers 1063; blade servers 1064; storage devices 1065; and networks and networking components 1066. In some embodiments, software components include network application server software 1067, quantum platform routing software 1068, and/or quantum software (not illustrated in FIG. 10).

Virtualization layer 1070 provides an abstraction layer from which the following examples of virtual entities may be provided: virtual servers 1071; virtual storage 1072; virtual networks 1073, including virtual private networks; virtual applications and operating systems 1074; and virtual clients 1075.

In one example, management layer 1080 may provide the functions described below. Resource provisioning 1081 provides dynamic procurement of computing resources and other resources that are utilized to perform tasks within the cloud computing environment. Metering and Pricing 1082 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1083 provides access to the cloud computing environment for consumers and system administrators. Service level management 1084 provides cloud computing resource allocation and management such that required service levels are met. Service Level Agreement (SLA) planning and fulfillment 1085 provide pre-arrangement for, and procurement of, cloud computing resources for which a future requirement is anticipated in accordance with an SLA.

Workloads layer 1090 provides examples of functionality for which the cloud computing environment may be utilized. Non-limiting examples of workloads and functions which may be provided from this layer include: mapping and navigation 1091; software development and lifecycle management 1092; virtual classroom education delivery 1093; data analytics processing 1094; transaction processing 1095; and quantum state preparation software 1096.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
    a memory that stores computer executable components; and
    a processor that executes the computer executable components stored in the memory, wherein the computer executable components comprise:
        a data loader component that prepares a quantum state of a probability distribution based on structure of a quantum amplitude estimation algorithm; and
        an operator component that constructs a quantum operator based on the quantum state to perform quantum amplitude estimation, wherein the probability distribution comprises an arbitrary probability distribution.

2. The system of claim 1, wherein the operator component applies an objective function of the quantum amplitude estimation algorithm to the quantum state.

3. The system of claim 1, wherein the computer executable components further comprise:
    an estimation component that employs the quantum amplitude estimation algorithm to perform the quantum amplitude estimation based on at least one of the quantum state or the quantum operator.

4. The system of claim 1, wherein the quantum operator comprises a reversible quantum operator.

5. The system of claim 1, wherein the data loader component prepares the quantum state of the probability distribution based on structure of the quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation algorithm.

6. A computer-implemented method, comprising:
preparing, by a system operatively coupled to a processor, a quantum state of a probability distribution based on structure of a quantum amplitude estimation algorithm; and
constructing, by the system, a quantum operator based on the quantum state to perform quantum amplitude estimation, wherein the probability distribution comprises an arbitrary probability distribution.

7. The computer-implemented method of claim 6, further comprising:
applying, by the system, an objective function of the quantum amplitude estimation algorithm to the quantum state.

8. The computer-implemented method of claim 6, further comprising:
employing, by the system, the quantum amplitude estimation algorithm to perform the quantum amplitude estimation based on at least one of the quantum state or the quantum operator.

9. The computer-implemented method of claim 6, wherein the quantum operator comprises a reversible quantum operator.

10. The computer-implemented method of claim 6, wherein the preparing comprises:
preparing, by the system, the quantum state of the probability distribution based on structure of the quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation algorithm.

11. A computer program product facilitating a quantum state preparation of a probability distribution process to perform amplitude estimation, the computer program product comprising a computer readable storage medium having program instructions embodied therewith, the program instructions executable by a processor to cause the processor to:
prepare, by the processor, a quantum state of a probability distribution based on structure of a quantum amplitude estimation algorithm; and
construct, by the processor, a quantum operator based on the quantum state to perform quantum amplitude estimation, wherein the probability distribution comprises an arbitrary probability distribution provided by an arbitrary probability density function.

12. The computer program product of claim 11, wherein the program instructions are further executable by the processor to cause the processor to:
apply, by the processor, an objective function of the quantum amplitude estimation algorithm to the quantum state.

13. The computer program product of claim 11, wherein the program instructions are further executable by the processor to cause the processor to:
employ, by the processor, the quantum amplitude estimation algorithm to perform the quantum amplitude estimation based on at least one of the quantum state or the quantum operator.

14. The computer program product of claim 11, wherein the quantum operator comprises a reversible quantum operator.

15. The computer program product of claim 11, wherein the prepare comprises;
prepare, by the processor, the quantum state of the probability distribution based on structure of the quantum amplitude estimation algorithm to reduce computational costs of the processor in loading arbitrary probability density functions into quantum states to be used in the quantum amplitude estimation algorithm executed on a quantum device.

16. A system, comprising:
a memory that stores computer executable components; and
a processor that executes the computer executable components stored in the memory, wherein the computer executable components comprise:
an estimation component that performs quantum amplitude estimation based on a quantum operator applied to a quantum state of a probability distribution; and
an error reduction component that performs numerical integration based on the quantum amplitude estimation to reduce an approximation error yielded by the quantum amplitude estimation, wherein the probability distribution comprises an arbitrary probability distribution.

17. The system of claim 16, wherein the computer executable components further comprise:
a data loader component that prepares the quantum state of the probability distribution based on structure of a quantum amplitude estimation algorithm.

18. The system of claim 16, wherein the quantum operator comprises a reversible quantum operator.

19. The system of claim 18, wherein the computer executable components further comprise:
an operator component that constructs the reversible quantum operator based on the quantum state and that applies an objective function of a quantum amplitude estimation algorithm to the quantum state to perform the quantum amplitude estimation.

20. The system of claim 16, wherein the computer executable components further comprise:
a data loader component that prepares the quantum state of the probability distribution based on structure of a quantum amplitude estimation algorithm to reduce computational costs of the processor in loading arbitrary probability density functions into quantum states to be used in the quantum amplitude estimation algorithm executed on a quantum device, thereby facilitating extended practical application of the quantum amplitude estimation algorithm.

21. A computer-implemented method, comprising:
performing, by a system operatively coupled to a processor, quantum amplitude estimation based on a quantum operator applied to a quantum state of a probability distribution; and
performing, by the system, numerical integration based on the quantum amplitude estimation to reduce an approximation error yielded by the quantum amplitude estimation, wherein the probability distribution comprises an arbitrary probability distribution.

22. The computer-implemented method of claim 21, further comprising:
preparing, by the system, the quantum state of the probability distribution based on structure of a quantum amplitude estimation algorithm.

23. The computer-implemented method of claim 21, wherein the quantum operator comprises a reversible quantum operator.

24. The computer-implemented method of claim 23, further comprising:
   constructing, by the system, the reversible quantum operator based on the quantum state and that applies an objective function of a quantum amplitude estimation algorithm to the quantum state to perform the quantum amplitude estimation.

25. The computer-implemented method of claim 21, further comprising:
   preparing, by the system, the quantum state of the probability distribution based on structure of a quantum amplitude estimation algorithm to reduce computational costs of the processor in loading arbitrary probability density functions into quantum states to be used in the quantum amplitude estimation algorithm executed on a quantum device.

* * * * *